United States Patent [19]

Williams

[11] 4,239,678

[45] Dec. 16, 1980

[54] FLAME RETARDANT THERMOPLASTIC COMPOSITIONS

[75] Inventor: Joseph B. Williams, Mt. Vernon, Ind.

[73] Assignee: General Electric Company, Pittsfield, Mass.

[21] Appl. No.: 867,450

[22] Filed: Jan. 6, 1978

[51] Int. Cl.$^3$ ................................................ C08K 5/42
[52] U.S. Cl. ............................ 260/42.18; 260/37 PC; 260/37 R; 260/45.7 R; 260/45.7 S; 260/45.9 E; 260/45.95 G
[58] Field of Search .......... 260/45.7 SF, 45.9 E (U.S. only), 260/873, 860 (U.S. only), 823, 42.18, 45.9 E, 45.95 G; 528/174, 381; 525/189, 535

[56] References Cited

U.S. PATENT DOCUMENTS

| | | | |
|---|---|---|---|
| 3,130,177 | 4/1964 | Grabowski | 260/880 R |
| 3,442,980 | 5/1969 | Grabowski | 260/880 R |
| 3,535,300 | 10/1970 | Gable | 260/45.7 RL |
| 3,736,293 | 5/1973 | Novak | 528/174 |
| 3,742,087 | 6/1973 | Nield | 260/860 |
| 3,755,256 | 8/1973 | Beverly | 260/823 |
| 3,830,781 | 8/1974 | Leslie et al. | 528/174 |
| 3,852,238 | 12/1974 | Luce | 260/860 |
| 3,891,719 | 6/1975 | Schirmer et al. | 260/873 |
| 3,895,091 | 7/1975 | Short et al. | 264/290 R |
| 3,933,734 | 1/1976 | Mark et al. | 260/45.7 SF |
| 3,940,366 | 2/1976 | Mark | 260/45.7 SF |
| 3,948,851 | 4/1976 | Mark | 260/45.7 SF |
| 3,971,756 | 7/1976 | Bialous et al. | 260/45.7 SF |
| 4,021,596 | 5/1977 | Bailey | 260/823 |
| 4,043,980 | 8/1977 | Baron et al. | 528/174 |
| 4,046,836 | 9/1977 | Adelmann et al. | 260/823 |
| 4,065,517 | 12/1977 | Okada et al. | 528/174 |
| 4,096,132 | 6/1978 | Edmonds, Jr. | 528/381 |
| 4,097,425 | 6/1978 | Niznik | 260/860 |

*Primary Examiner*—Howard E. Schain
*Assistant Examiner*—R. A. White
*Attorney, Agent, or Firm*—Morgan, Finnegan, Pine, Foley & Lee

[57] ABSTRACT

A flame retardant thermoplastic composition comprising an organic sulfonate flame retardant additive in admixture with a composition selected from the group comprising a polyarylsulfone, a polyarylethersulfone, a polyphenylsulfide, blends of a polyarylethersulfone and a polyarylsulfone, blends of a polyarylethersulfone and a polyphenylsulfide, blends of a polyarylsulfone and a polyphenylsulfide, blends of a polyarylenecarbonate and acrylonitrile-butadiene-styrene copolymer (ABS), blends of a polyarylenecarbonate, acrylonitrile-butadiene-styrene copolymer (ABS) and a polyarylsulfone, blends of a polyarylenecarbonate, acrylonitrile-butadiene-styrene copolymer (ABS) and a polyarylethersulfone, blends of a polyarylenecarbonate, acrylonitrile-butadiene-styrene copolymer (ABS) and a polyphenylsulfide, and blends of a polyarylenecarbonate, acrylonitrile-butadiene-styrene copolymer (ABS), together with two or more compounds selected from the group comprising polyarylsulfones, polyarylethersulfones and polyphenylsulfides. The composition may additionally contain an organic halogen-containing flame retardant additive.

18 Claims, No Drawings

FLAME RETARDANT THERMOPLASTIC COMPOSITIONS

This invention is directed to a flame retardant thermoplastic composition and, in particular, a composition containing an organic sulfonate flame retardant additive in admixture with one or more compounds selected from the group comprising a polyarylsulfone, a polyarylethersulfone, a polyphenylsulfide, blends of a polyarylethersulfone and a polyarylsulfone, blends of a polyarylethersulfone and a polyphenylsulfide, blends of a polyarylsulfone and a polyphenylsulfide, blends of a polyarylenecarbonate and acrylonitrile-butadiene-styrene copolymer (ABS), blends of a polyarylenecarbonate, acrylonitrile-butadiene-styrene copolymer (ABS) and a polyarylsulfone, blends of a polyarylenecarbonate, acrylonitrile-butadiene-styrene copolymer (ABS) and a polyarylethersulfone, blends of a polyarylenecarbonate, acrylonitrile-butadiene-styrene copolymer (ABS) and a polyphenylsulfide, and blends of a polyarylenecarbonate, acrylonitrile-butadiene-styrene copolymer (ABS), together with two or more coompounds selected from the group comprising polyarylsulfones, polyarylethersulfones and polyphenylsulfides. The composition may additionally contain an organic halogen-containing flame retardant additive.

BACKGROUND OF THE INVENTION

With the increasing concern for safety, there is a positive move toward providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters' Laboratories, Inc. Subject 94. This document sets forth certain conditions by which materials are rated.

In the art, there are many known flame retardant additives which are employed by mixing with products to render such materials flame retardant. Such flame retardant additives have been known to be employed in amounts of 5 to 20 weight percent in order to provide flame retardant characteristics to those products which are combustible.

Aromatic carbonate polymer compounds (polyarylenecarbonates), polyarylsulfones, and polyarylethersulfones, in admixture with themselves, or when blended with acrylonitrile-butadiene-styrene copolymer (ABS), do not exhibit adequate flame retardancy to meet Underwriters' Laboratories Subject 94 ratings in certain thicknesses. As a result, various flame retardant additives have been disclosed in the art which render such compositions flame retardant, which are effective in varying degrees.

Furthermore, when used alone the aforementioned aromatic carbonate polymer compounds (polarylenecarbonates) polyarylsulfones and polyarylethersulfones, while sometimes meeting the broad standard of Underwriters' Laboratories Subject, nevertheless exhibit longer flame out times than when used in admixture with the compounds which are the subject of the present invention.

SUMMARY OF THE INVENTION

It has now been surprisingly discovered that polyarylsulfones, polyarylethersulfones and blends of two or more compounds selected from the group comprising polyarylenecarbonates, acrylonitrile-butadiene-styrene copolymers, polyarylsulfones and polyarylethersulfones can be made flame retardant by incorporating with such compositions a minor amount of an organic sulfonate as a flame retardant additive.

The organic sulfonates useful as flame retardant additives in the present invention are of the general formulas $RSO_3{-}M^+$ and $(RSO_3{-})_2M'^{++}$ where $M^+$ is an alkali metal ion, $M'^{++}$ is an alkaline earth metal ion, and R is chosen from the group consisting of

and

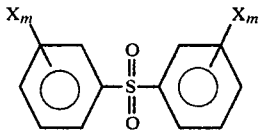

where each X is independently chosen from the group consisting of fluorine, bromine, iodine, $NO_2$ and

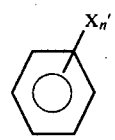

where X' is the same as X, and n=0–5, m=0–4.

The preferred flame retardant additives are compounds selected from the group comprising

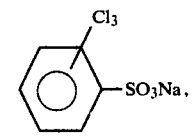  I

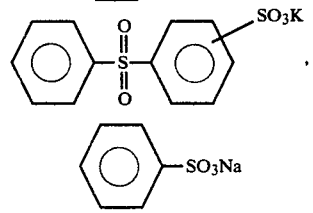  II

III and compounds of the formula

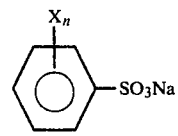  IV wherein X is Cl or Br
and n is a number from 0 to 5
or blends thereof.

The amount of the additive employed herein can vary, preferably, from about 0.01 to about 10 parts per hundred parts of the composition. In one preferred embodiment, the amount of additive incorporated with the composition is 0.5 parts per hundred parts aromatic polycarbonate. In a second preferred embodiment, the amount of additive is 1.0 part per hundred parts. The compositions of this invention can also contain other flame retardant additives, pigments, dyes, fillers, stabilizers and the like. Additionally, drip retarding agents which can include, but are not limited to, fluorinated polyolefins, fibrous glass, siloxanes and mixtures thereof can also be incorporated in the composition. The compositions can be processed by normal thermoplastic techniques as known in the art, such as injection molding, foam molding, extrusion, blow molding and the like.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

One hundred parts of Union Carbide's polyarylsulfone UDEL® P-1700 and 1 part of a compound of Formula I are mixed by dry tumbling.

The resulting mixture is then fed to an extruder operating at about 265° C., and the extrudate is comminuted into pellets. These pellets are then injection molded at about 300° C. into test bars of about 5 inches by ½ inch by about 1/16 inch thick. Five test bars are subject to the test procedure set forth in Underwriters' Laboratories, Inc. Subject UL-94, Burning Test for Classifying Materials. In accordance with this test procedure, materials so investigated are rated either V-0, V-1 or V-2 based on the results of 5 specimens. The criteria for each rating per UL-94 is briefly as follows:

"94 V-0":
No single flaming combustion after removal of the igniting flame shall exceed 10 seconds and none of the specimens shall drip flaming particles which ignite absorbent surgical cotton placed 12" below the specimen. Total flame out time for all 5 specimens (10 ignitions) cannot exceed 50 seconds.

"94 V-1":
No signle flame combustion after removal of the igniting flame shall exceed 30 seconds and none of the specimens shall drip flaming particles which ignite absorbent surgical cotton placed 12" below the specimen. Total flame out time for all 5 specimens (10 ignitions) cannot exceed 250 seconds.

"94 V-2":
No single flaming combustion after removal of the igniting flame shall exceed 30 seconds. The specimens drip flaming particles which burn only briefly, some of which ignite absorbent surgical cotton placed 12" below the specimen. Total flame out time for all 5 specimens (10 ignitions) cannot exceed 250 seconds.

In addition, a test bar which continues to burn for more than 30 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as 94 V-2 and the other four are classified as 94 V-0, then the rating for all 5 bars is 94 V-2.

CONTROL I

Control test bars are made as described above except without the flame retardant additive. Results of the control test bars are as follows:

| | |
|---|---|
| Total flame out time (sec): | 158.1 |
| Range of flame out (sec): | 2.6–47.7 |
| No. of burning drips per test bar: | 2 |
| Rating: | Burns |

In contrast, results of the test bars incorporating 1 part of a compound of Formula I flame retardant additive per hundred parts of UDEL® P-1700, brand of polyarylsulfone are as follows:

EXAMPLE I—With Additive

| | |
|---|---|
| Total flame out time (sec): | 30.0 |
| Range of flame out (sec): | 0.8–6.2 |
| No. of burning drips per test bar: | 0 |
| Rating: | 94 V-0 |

EXAMPLE II

In the same manner as in Example I, a composition of 100 parts of I.C.I's polyarylethersulfone PES 200P and 0.5 parts of a compound of Formula I flame retardant additive is prepared and made into test bars. The results of flame tests on these bars as compared to control bars of the same composition having no additive is as follows:

CONTROL II

| | |
|---|---|
| Total flame out time (sec): | 27.3 |
| Range of flame out time (sec): | 1.3–4.3 |
| No. of burning drips per test bar: | 0 |
| Rating: | 94 V-0 |

EXAMPLE II—With Additive

| | |
|---|---|
| Total flame out time (sec): | 12.8 |
| Range of flame out time (sec): | 0.9–2.3 |
| No. of burning drips per test bar: | 0 |
| Rating: | 94 V-0 |

EXAMPLE III

In the same manner as in Example I, a composition of 100 parts of a blend of 90 percent poly(BPA) carbonate and 10 percent RYTON® P4, a polyphenylsulfide manufactured by Phillips Chemical Co., and 0.5 parts of a compound of Formula I flame retardant additive is prepared and made into test bars. The results of flame tests on these bars as compared to control bars of the same composition having no additive is as follows:

CONTROL III

| | |
|---|---|
| Total flame out time (sec): | 60* |

| -continued | |
|---|---|
| Range of flame out time (sec): | 3.3–15.8 |
| No. of burning drips per test bar: | 3 |
| Rating: | 94 V-2 |

*Only three bars tested, the average flame out time per ignition (2 per bar) was 10 seconds.

EXAMPLE III—With Additive

| | |
|---|---|
| Total flame out time (sec): | 26.9 |
| Range of flame out time (sec): | 0.8–5.5 |
| No. of burning drips per test bar: | 0–1 |
| Rating: | 94 V-2 |

EXAMPLE IV

In the same manner as in Example I, a composition of 100 parts of a blend of 90 percent poly(BPA)carbonate, and 10 percent I.C.I.'s polyethersulfone PES 200S and 0.5 parts of a compound of Formula I flame retardant additive is prepared and made into test bars. The results of flame tests on these bars as compared to control bars of the same composition having no additive is as follows:

CONTROL IV

| | |
|---|---|
| Total flame out time (sec): | 42* |
| Range of flame out time (sec): | 0.2–11.2 |
| No. of burning drips per test bar: | 2–3 |
| Rating: | 94 V-2 |

*Only three bars tested, the average flame out time per ignition (2 per bar) was 7 seconds.

EXAMPLE IV—With Additive

| | |
|---|---|
| Total flame out time (sec): | 31.4 |
| Range of flame out time (sec): | 1.7–5.4 |
| No. of burning drips per test bar: | 0–1 |
| Rating: | 94 V-2 |

EXAMPLE V

In the same manner as in Example I, a composition of 100 parts of a blend of 90 percent poly(BPA)carbonate and 10 percent I.C.I.'s polyethersulfone PES 300S and 0.5 parts of a compound of Formula I flame retardant additive is prepared and made into test bars. The results of flame tests on these bars as compared to control bars of the same composition having no additive is as follows:

CONTROL V

| | |
|---|---|
| Total flame out time (sec): | 60* |
| Range of flame out time (sec): | 6.6–13.8 |
| No. of burning drips per test bar: | 2–3 |
| Rating: | 94 V-2 |

*Only three bars tested, the average flame out time per ignition (2 per bar) was 10 seconds.

EXAMPLE V—With Additive

| | |
|---|---|
| Total flame out time (sec): | 29.4 |
| Range of flame out time (sec.): | 1.1–5.5 |
| No. of burning drips per test bar: | 0–1 |
| Rating: | 94 V-2 |

In the practice of this invention, any of the aromatic polycarbonates (polyarylenecarbonates) can be employed herein. These are homopolymers and copolymers and mixtures thereof that are prepared by reacting a dihydric phenol with a carbonate precursor. Typical of some of the dihydric phenols that may be employed in the practice of this invention are bisphenol-A (2,2-bis(4-hydroxyphenyl)propane), bis(4-hydroxyphenyl)methane, 2,2-bis(4-hydroxy-3-methylphenyl)-propane, 4,4-bis(4-hydroxyphenyl)heptane, 2,2-(3,5,3',5'-tetra-chloro-4,4'-dihydroxydiphenylpropane, 2,2-(3,5,3',5'-tetrabromo-4,4'-dihydroxydiphenyl)propane, (3,5'-dichloro-4,4'-dihydroxyphenyl)methane. Other dihydric phenols of the bisphenol type are also available and are disclosed in U.S. Pat. Nos. 2,999,835; 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonates, etc., di-(alkylphenyl) carbonates such as di(tolyl) carbonate, etc., di-(naphthyl) carbonate, di-(chloronapththyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers (polyarylenecarbonates) of this invention may be prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts included (a) tertiary amines such as, for example, triethylamine, tripropylamine, N,N-dimethyl-aniline; (b) quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl-ammonium iodide, benzyltrimethyl ammonium chloride and (c) quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

The polyarylsulfones and polyarylethersulfones which may be suitably employed in the practice of this invention are strong stable plastics utilized primarily in heavy duty applications and are commercially available from various sources, including Union Carbide which markets a product under the trade name UDEL® Polysulfone and from I.C.I. U.S. Inc. which markets polyethersulfones in various grades having different performance characteristics. The chemical structure and preparation of these compositions are well-known and have been discussed at great length in the *Encyclopedia of Polymer Science and Technology*, Volume II, John Wiley & Sons, Inc., New York, New York, 1969, at pages 747 et seq.

The polyphenylsulfides which may be suitably employed in the practice of this invention are compounds similar to RYTON® P4, a polyphenylsulfide manufactured by and commercially available from Phillips Chemical Company.

Likewise, the acrylonitrile-butadiene-styrene copolymer which may be suitably employed in practicing the present invention are well-known commercial products which are thermoplastic polymer blends that may be produced from all three monomers or may be mixtures of copolymers or graft polymers such as, for example, styrene and acrylonitrile grafted on polybutadiene. The chemical structure and preparation of this class of copolymers are well known and have been discussed at great length in the *Encyclopedia of Polymer Science and Technology*, Volume 1, at pages 436 et seq.

Obviously, other materials can also be employed with the compositions of this invention and include such materials as anti-static agents, pigments, mold release agents, thermal stabilizers, ultraviolet stabilizers, reinforcing fillers and the like.

The compositions of this invention may additionally have admixed therewith a minor amount of a halogen-containing flame retardant additive, preferably in an amount of from 0.01 to about 5 parts per one hundred parts aromatic polycarbonate. Representative but not limiting examples of a halogen-containing flame retardant additive include hexabromobenzene, hexabromodiphenyl, hexachlorodiphenyl, decabromodiphenyl, decachlorodiphenyl, decabromodiphenyl ether, decachlorodiphenyl ether, 2,2-(3,3',5,5'-tetrabromo-4,4'-dihydroxydiphenyl)propane, 2,2-(3,3',5,5'-tetrachloro-4,4'-dihydroxy-diphenyl)propane, an adduct of cyclohexane and hexachlorocyclopentadiene (chloran), etc., and mixtures thereof.

It is contemplated that the various recited flame retardant additives which are the subject of this invention may also be suitably employed in the compositions in admixture with one another in various proportions such as to achieve the desired degree of flame retardancy for a particular composition.

Since certain changes may be made in carrying out the above process and in the compositions set forth without departing from the scope of this invention, it is intended that all matters contained in the above description shall be interpreted as illustrative and not in a limiting sense.

What is claimed is:

1. A flame retardant thermoplastic composition comprising an organic sulfonate flame retardant additive of the general formula $RSO_3—M^+$ or $(RSO_3—)_2M'^{++}$, where $M^+$ is an alkali metal ion, $M'^{++}$ is an alkaline earth metal ion, and R is chosen from the group consisting of

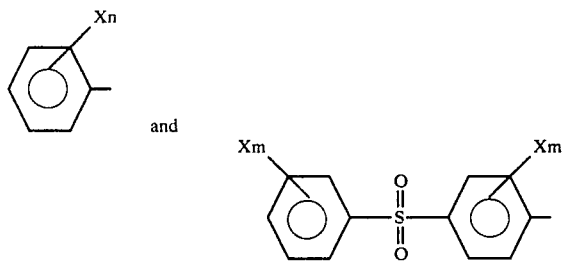

where each X is independently chosen from the group consisting of fluorine, bromine, iodine, $NO_2$ and

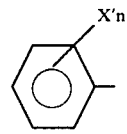

where X' is the same as X, and n=0–5, m=0–4 and n and m are not more than 1 on any single carbon atom; in admixture with a polymer, or a blend of polymers, selected from the group consisting essentially of polyarylsulfone, polyarylethersulfone, polyphenylsulfide, blends of a polyarylethersulfone and a polyarylsulfone, blends of a polyarylethersulfone and a polyphenylsulfide, blends of a polyarylsulfone and a polyphenylsulfide, blends of a acrylonitrile-butadiene-styrene copolymer (ABS) and a polyarylsulfone, blends of an acrylonitrile-butadiene-styrene copolymer (ABS) and a polyarylethersulfone, blends of an acrylonitrile-butadiene-styrene copolymer (ABS) and a polyphenylsulfide, and blends of an acrylonitrile-butadiene-styrene copolymer (ABS), together with two or three polymers selected from the group consisting of polyarylsulfones, polyarylethersulfones and polyphenylsulfides.

2. A flame retardant thermoplastic composition according to claim 1 wherein the organic sulfonate flame retardant additive is present in an amount of about 0.01-10 parts per 100 parts of the composition.

3. A flame retardant thermoplastic composition according to claim 2 wherein the organic sulfonate flame retardant additive is present in an amount from about 0.5-1.0 parts per 100 parts of the composition.

4. A flame retardant thermoplastic composition according to caim 1 having in admixture therewith a sufficient quantity of a drip retarding agent chosen from the group consisting of fluorinated polyolefins, fibrous glass, siloxanes and mixtures thereof to render said composition non-dripping.

5. A flame retardant thermoplastic composition according to claim 1 having in admixture therewith an organic halogen-containing flame retardant additive.

6. A flame retardant thermoplastic composition comprising an organic sulfonate flame retardant additive according to claim 1 in admixture with a polymer selected from the group consisting of polyarylsulfones, polarylethersulfones, polyphenylsulfide and blends thereof alone or in combination with at least one acrylonitrile-butadiene-styrene copolymer (ABS).

7. A flame retardant thermoplastic composition according to claim 6 wherein the acrylonitrile-butadiene-styrene copolymer component is present in an amount up to about 50 weight percent of the composition.

8. A flame retardant thermoplastic composition according to claim 6 wherein the organic sulfonate additive is a compound selected from the group consisting of

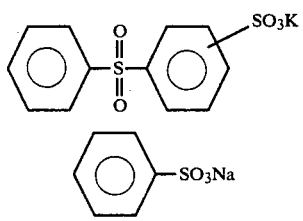

and compounds of the formula

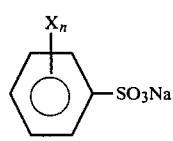

wherein X is Cl or Br, and n is a number from 0 to 5, and is not more than 1 on any single carbon atom, or blends thereof.

9. A flame retardant thermoplastic composition according to claim 8 wherein the first retardant additive is a compound selected from the group consisting of

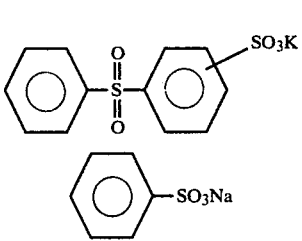

and compounds of the formula

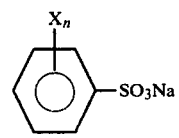

wherein X is Cl or Br, and n is a number from 0 to 5, and is not more than 1 on any single carbon atom, or blends thereof;

in admixture with a suitable organic halogen-containing flame retardant additive.

10. A flame retardant thermoplastic composition comprising an organic sulfonate flame retardant additive as defined in claim 1 in admixture with a polyarylethersulfone.

11. A flame retardant thermoplastic composition according to claim 10 wherein the organic sulfonate is a compound selected from the group consisting of

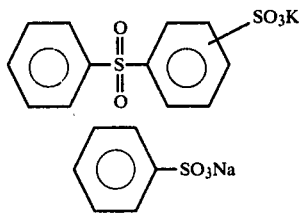

and compounds of the formula

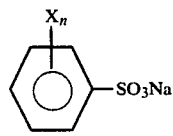

wherein X is Cl or Br, and n is a number from 0 to 5, and is not more than 1 on any single carbon atom, or blends thereof.

12. A flame retardant thermoplastic composition according to claim 11 wherein the flame retardant additive is a compound selected from the group consisting of

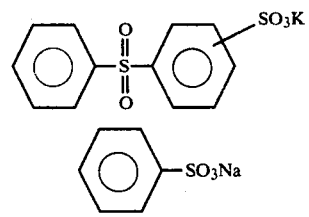

and compounds of the formula

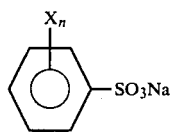

III wherein X is Cl or Br, and n is a number from 0 to 5, and is not more than 1 on any single carbon atom, or blends thereof;
in admixture with a suitable organic halogen-containing flame retardant additive.

13. A flame retardant thermoplastic composition comprising an organic sulfonate flame retardant additive as defined in claim 1 in admixture with a polyarylsulfone.

14. A flame retardant thermoplastic composition according to claim 13 wherein the organic sulfonate is a compound selected from the group consisting of

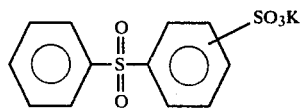

I

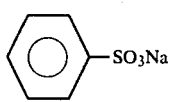

II and compounds of the formula

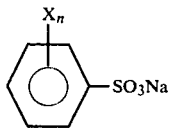

III wherein X is Cl or Br, and n is a number from 0 to 5, and is not more than 1 on any single carbon atom, or blends thereof.

15. A flame retardant thermoplastic composition according to claim 14 wherein the flame retardant additive is a compound selected from the group consisting of

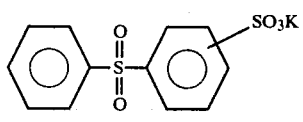

I

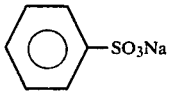

II and compounds of the formula

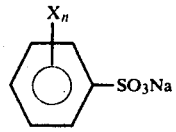

III wherein X is Cl or Br, and n is a number from 0 to 5, and is not more than 1 on any single carbon atom, or blends thereof;
in admixture with a suitable organic halogen-containing flame retardant additive.

16. A flame retardant thermoplastic composition comprising an organic sulfonate flame retardant additive as defined in claim 1 in admixture with a polyphenylsulfide.

17. A flame retardant thermoplastic composition according to claim 16 wherein the organic sulfonate is a compound selected from the group consisting of

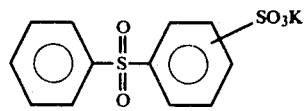

I

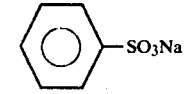

II and compounds of the formula

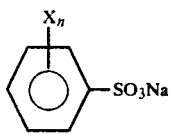

III wherein X is Cl or Br, an n is a number from 0 to 5, and is not more than 1 on any single carbon atom, or blends thereof.

18. A flame retardant thermoplastic composition according to claim 17 wherein the flame retardant additive is a compound selected from the group consisting of

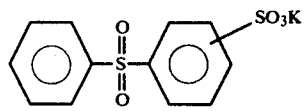

I

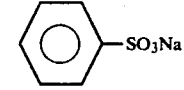

II and compounds of the formula

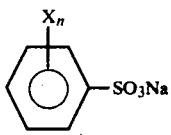

III wherein X is Cl or Br, and n is a number from 0 to 5, and is not more than 1 on any single carbon atom, or blends thereof;
in admixture with a suitable organic halogen-containing flame retardant additive.

* * * * *

UNITED STATES PATENT AND TRADEMARK OFFICE
CERTIFICATE OF CORRECTION

PATENT NO. : 4,239,678
DATED : 12/16/80
INVENTOR(S) : Joseph Blair Williams

It is certified that error appears in the above-identified patent and that said Letters Patent are hereby corrected as shown below:

Column 5, line 30, "0.2" should be --0.9--.

Column 9, line 18, "caim" should be --claim--.

Column 9, line 67, "first retardant" should be --fire retardant--.

Signed and Sealed this

First Day of September 1981

[SEAL]

Attest:

Attesting Officer

GERALD J. MOSSINGHOFF

Commissioner of Patents and Trademarks